United States Patent
Lindgren et al.

(10) Patent No.: US 9,268,877 B2
(45) Date of Patent: Feb. 23, 2016

(54) METHOD AND ARRANGEMENTS FOR ENABLING MODIFICATIONS OF XML DOCUMENTS

(75) Inventors: Anders Lindgren, Älvsjö (SE); Christer Boberg, Tungelsta (SE); Mikael Klein, Huddinge (SE); Sofie Lassborn, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 847 days.

(21) Appl. No.: 13/496,512

(22) PCT Filed: Sep. 22, 2009

(86) PCT No.: PCT/SE2009/051053
§ 371 (c)(1),
(2), (4) Date: Mar. 16, 2012

(87) PCT Pub. No.: WO2011/037500
PCT Pub. Date: Mar. 31, 2011

(65) Prior Publication Data
US 2012/0179959 A1   Jul. 12, 2012

(51) Int. Cl.
*G06F 17/00* (2006.01)
*G06F 17/30* (2006.01)
*G06F 17/22* (2006.01)
*H04L 29/08* (2006.01)
*H04L 29/06* (2006.01)

(52) U.S. Cl.
CPC ...... *G06F 17/30923* (2013.01); *G06F 17/2247* (2013.01); *G06F 17/2288* (2013.01); *H04L 67/02* (2013.01); *H04L 69/28* (2013.01)

(58) Field of Classification Search
CPC .................. G06F 2221/2137; G06F 17/30923; G06F 17/2247
USPC .......................................................... 715/234
See application file for complete search history.

(56) References Cited

U.S. PATENT DOCUMENTS

| 7,523,097 | B1 * | 4/2009 | Wilson et al. |
| 2004/0230894 | A1 | 11/2004 | Elza et al. |
| 2006/0123119 | A1 * | 6/2006 | Hill et al. ....................... 709/227 |
| 2008/0008106 | A1 * | 1/2008 | Boberg ................. H04L 12/185 370/270 |
| 2008/0104124 | A1 * | 5/2008 | Bao et al. .................... 707/104.1 |

(Continued)

OTHER PUBLICATIONS

Niemi, et al: "Publication of Partial Presence Information". Network Working Group. Request for Comments: 5264. Sep. 2008.

(Continued)

*Primary Examiner* — Kavita Padmanabhan
*Assistant Examiner* — Andrew McIntosh

(57) ABSTRACT

A method, a server and a client for enabling time limited modifications of XML nodes in XML documents, where a modified document can be restored to its original content upon expiry of an expire time, which has been specified for the modification, are provided. A request for a time limited modification of an XML node, including an expire time, is transmitted from a client to a server. At the server, a timer is either started, in case no timer is pending for the XML node, or re-set, in case a timer is already pending for the XML node. The present version of the XML node is stored, before it is modified, according to modification data provided in the request. Upon timer timeout the requested modification will no longer be valid, and therefore the XML node is restored to its stored version of the XML node.

27 Claims, 5 Drawing Sheets

(56) References Cited

U.S. PATENT DOCUMENTS

| | | | |
|---|---|---|---|
| 2009/0125803 A1* | 5/2009 | Bao et al. | 715/235 |
| 2009/0222525 A1* | 9/2009 | Jayawant Pattan | 709/206 |
| 2010/0318624 A1* | 12/2010 | Pattan et al. | 709/207 |

OTHER PUBLICATIONS

Niemi: "Session Initiation Protocol (SIP) Extension for Event State Publication". Network Working Group, Request for Comments: 3903. Oct. 2004.

* cited by examiner

METHOD AND ARRANGEMENTS FOR ENABLING MODIFICATIONS OF XML DOCUMENTS

TECHNICAL FIELD OF THE INVENTION

The present invention relates generally to a method and arrangements for enabling modifications of XML documents stored in a Server, and more specifically to enable time limited modifications in a Server.

BACKGROUND

Extensible Markup Language (XML) has become a widespread file format for a large number of office-productivity tools, as well as for various types of Internet Protocol (IP) multimedia services, which may be distributed e.g. via the IP Multimedia Subsystem (IMS), or any other architectural framework which is adapted for delivery of IP multimedia services. The XML Configuration Access Protocol (XCAP) allows a device provided with XCAP Client functionality to read, write and modify application configuration data stored in XML format on a Server which is provided with XCAP Server functionality.

XML Document Management (XDM) is an Open Mobile Alliance (OMA) specification which enables XCAP Clients to access and manipulate XML documents stored on XCAP Servers. According to the OMA XDM standard, a Client having XCAP Client functionality may be referred to as an XDM Client (XDMC), while a corresponding Server may be referred to as an XDM Server (XDMS).

Via XCAP an XDMC can modify a document e.g. by adding content to, or modifying a part of an XML document, typically referred to as an XML node. Such a modification may typically be achieved by using an XCAP PUT message for delivering the respective content from the XDMC to the XDMS.

FIG. 1 is an illustration of a typical scenario for such a modification, where an XDMC 100 requires an update of an XML node in an XML document which is already stored at an XDMS 101. XDMC 100 stores the respective XML node content locally before a request, typically in the form of an XCAP PUT, is sent to XDMS 101, via an Aggregation Proxy (AP) 102, as indicated with steps 1:1 and 1:2. In a next step 1:3, the XML node of the relevant XML document is modified according to conventional modification procedures.

In subsequent steps 1:4 and 1:5, the executed modification is notified to other XDMCs, here represented by XDMC 104. Such a notification may typically be executed by transmitting a respective SIP Notify to each respective XDMC that is to be notified.

If the update is of a temporary nature, XDMC 100 has to stay on line and wait until the required time which specifies the duration of the temporary update has elapsed. Thereafter XDMC 100 has to repeat steps 1:1 and 1:2, once again, as indicated with steps 1:6 and 1:7, respectively in FIG. 1. This time, however, the request is provided with the XML node content which was valid prior to the first modification, to enable the XDMC to use this content to undo the previous update. A specific scenario where such an aspect may be of relevance is e.g. when a specific user is to be blocked from a service, but only for a limited time interval, after which the blocked user will again be admitted to use the service.

Since XCAP requires that it is the XDMC that updates the XDMS, problems may occur e.g. if the XDMC runs out of batteries, or is switched off prior to expiry of the stated expire time. In such a situation, an XML node of an XML document that was intended to have a limited validity, may instead erroneously remain in the document for a long time.

Present mechanisms for enabling time limited modification also requires complex functionality in the XDMC.

SUMMARY

The object of the present document is to address the problems outlined above. In particular, it is an object of the present document to provide a mechanism which enables a Client to request a time limited modification of an XML node of an XML document, where, upon expiry of a specified time value, the modified XML node is restored to the content it had prior to the modification without the Client having to perform any additional step, apart from transmitting one single request.

According to one aspect, a method for managing a modification of an XML document when executed at a Server of a communication network is provided. The suggested method for handling a time limited modification of an XML node is started when the Server receives a request for a time limited modification of a node of an XML document from a Client. Such a request comprise modification data, and an associate expire time, which indicates a time-to-live to be applied for the requested modification. An updating procedure starts a timer associated with the XML node, on the basis of the received expire time. The present version of the XML node is stored, after which the XML document is modified, according to the modification data received in the request. When the expire time has expired, the XML node is restored to the previously stored version of the XML node.

In case a subsequent request for a time limited modification is received for the XML node, before timeout of a pending timer for the XML node, an updating procedure may be performed, where the pending timer is re-set, according to the expire time provided in the subsequent request.

According to one exemplary embodiment, the suggested method is applied for requests which are transmitted using a HTTP based method, such as e.g. HTTP Post, XCAP Put or XCAP Delete, while according to another exemplary embodiment, the suggested method is instead applied for requests which are transmitted using a SIP based method, such as e.g. a SIP Publish.

According to another aspect, a method for enabling a modification of an XML document in a Server of a communication network, to be executed by a Client is provided. The method starts by generating a request for a time limited modification of a node of an XML document, where the request comprise an identification of the XML document, modification data, and an expire time, wherein the expire time is indicating a time-to-live for the requested modification. The request is then transmitted to the server, where the time limited modification will be valid for the duration of the requested expire time, and restorable to the previous version of the XML node when the expire time has expired.

Once a time limited modification has been requested by a Client, and a timer is pending for an XML node, the Client may prolong the time-to-live of the request by providing a new, subsequent request to the Server, where the new request comprise the same modification data and the same, or a different expire time.

The request may be transmitted, using a HTTP based method, such as e.g. a HTTP Post, XCAP Put or XCAP Delete, or using a SIP based method, such as e.g. a SIP Publish.

According to yet another aspect, a Server of a communication network which is adapted to managing time limited modifications of an XML document, is provided. The Server comprises a communication unit which is adapted to receive a request for a time limited modification of a node of an XML document from a Client, where the request comprises modification data, and an expire time, where the expire time indicates a time-to-live for the requested modification.

The Server also comprises a Server function, which is connected to the communication unit and which is adapted to perform an updating procedure in response to having received a request for a time limited modification, where the updating procedure comprise the steps of: starting, on the basis of the received expire time, a timer associated with the XML node; storing the present version of the XML node, and, modifying the XML node according to the requested modification data.

The Server function is further adapted to restore the XML node to the stored version of the XML node when the expire time has expired.

The Server function may also be adapted to re-set a pending timer, on the basis of an expire time of a subsequent request, if a subsequent request for a time limited modification is received for the XML node prior to recognizing timeout of the pending timer.

According to one exemplary embodiment, the Server function is an XCAP Server function, while according to another alternative embodiment, the server function is instead a SIP server function. A typical embodiment of a server which may be provided with a SIP server function and/or an XCAP Server function is an XDM Server.

According to yet another aspect, a client for enabling a time limited modification of an XML document in a Server of a communication network, is provided. The Client comprises a Client function adapted to generate a request for a time limited modification of a node of an XML document, wherein the request comprise modification data, and an expire time, wherein the expire time indicates a time-to-live for the requested modification. The Client also comprises a communication unit which is connected to the Client function and adapted to transmit the request to the server. Such a Client configuration, enables a requested modification of the XML node to be performed at the Server, where the modification is valid for the duration of the expire time of the request and where the XML node is restorable to the previous version of the XML node when the expire time has expired.

According to one embodiment, the client function may be an XCAP Client function, which is adapted to generate a request, using a HTTP method, such as e.g. HTTP Post, as carrier for a request, while according to another, alternative embodiment, the Client function may instead be a SIP Client function, which is adapted to generate a request using a SIP method, such as e.g. SIP Publish, as carrier for a request. The Client may be e.g. an XDM Client, and may be implemented e.g. on a mobile telephone, a PDA, a laptop or a PC.

Further features of the present invention and its benefits can be understood from the detailed description below.

BRIEF DESCRIPTION OF THE DRAWINGS

The invention will now be described in more detail by means of exemplary embodiments and with reference to the accompanying drawings, in which.

DETAILED DESCRIPTION

Figure 1:
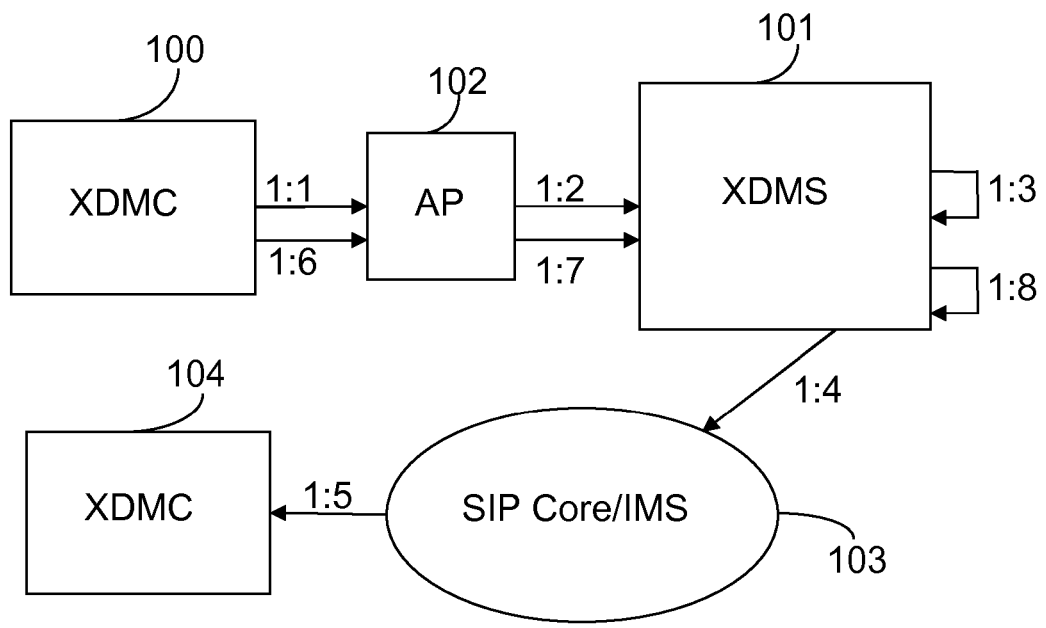
FIG. 1 is a simplified overview illustrating a scenario and procedure for enabling time limited modifications of XML nodes in an XDMS, according to the prior art.

The present document refers to a mechanism which enables a Client to request a temporary modification of an XML node of an XML document, which is stored on a Server, without requiring more than one single message to be sent from the Client to the Server.

The suggested modification mechanism allows the XML node to be changed on a time limited basis, where, upon expiry of a specified expire time, the modified XML node is restored to the content which was valid prior to the requested modification.

The suggested modification mechanism also allows a pending expire time to be prolonged by providing one or more subsequent requests, carrying an updated expire time, to the Server prior to expiry of the pending expire time.

If a user A wants to block another user, user B, from a specific service for a specific time, such as e.g. 2 hours, such a blocking may, according to the suggested modification mechanism be executed by user A by transmitting a requesting for the relevant XML node to be modified to the relevant Server, such that user B is blocked for 2 hours. At the server, a timer, having a duration of 2 hours is started for the XML node, the present version of the XML document, comprising the relevant XML node is stored and the requested modification is executed.

If after 1.5 hour, user A decides that he wants to prolong the blocking, e.g. with 2 more hours, he may transmit yet another request, requesting for the timer associated with the XML node to be running for another 1.5 hour, i.e. any earlier request is replaced by a new one. If no more request is received for the XML node before timeout of the timer, the XML node is restored to its stored version, upon timer timeout.

If user A decides that also user C is to be blocked for a specific time period, he may transmit another time limited request, addressing another XML node, which will initiate another timer which will be associated with this other XML node at the Server.

From hereinafter a Client is to be referred to as a Client having a Client function, such as e.g. a SIP Client function and/or an XCAP Client function, while a Server is to be referred to as a Server provided with a Server function, such as e.g. a SIP Server function and/or an XCAP Server function.

Such a Client may be implemented e.g. as an XDMC, while the Server may be implemented e.g. as an XDMS. The respective Client functions and Server functions may be integrated as embedded Client functions and Server functions respectively.

In a typical scenario, the Client is an integrated part of a mobile User Device, such as e.g. a mobile telephone, a Personal Digital Assistant (PDA), or a laptop, or a stationary user device, such as e.g. a Personal Computer (PC). As such, the Client will enable a user of the User Device to access various types of IP-based services from corresponding Servers.

The enhanced modification mechanism suggested in this document is achieved by adding time-to-live information, specifying an expire time for an XML node modification to a request for a modification of the XML node, which is transmitted from a Client to a Server. Thereby, the Server will be able to execute a requested time limited modification, to start a timer associated with the modified XML node, and to monitor the expire time, specified by the time-to-live information. The Server will also be able to undo a modification, by restoring the modified XML document to the content it had prior to the modification, without the Client having to make any further considerations, apart from preparing and transmitting the mentioned request to the Server.

Figure 2:
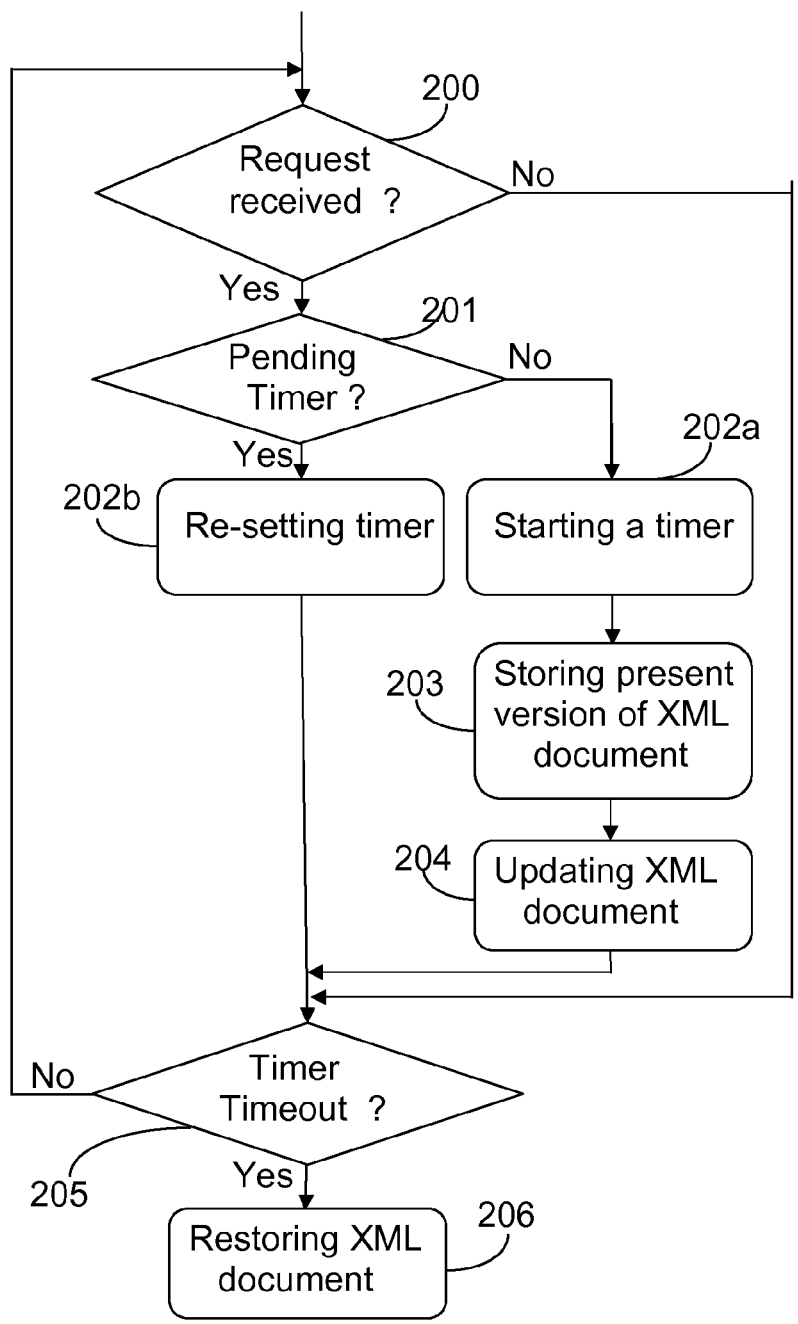
FIG. 2 is a flow chart illustrating a method for processing a time limited modification of an XML document at a server, according to one exemplary embodiment.

FIG. 2 is a flow chart, illustrating the steps of the suggested method to be executed on a Server, according to one exemplary embodiment. The described method steps refer to a procedure to be executed for performing a modification of one specific XML node of an XML document. Consequently, a separate process will be required for different XML nodes of an XML document, and, thus, a number of such processes may be running in parallel on the respective Server.

In a first step 200, a request for a time limited modification of an XML node is received by a Server. The request comprise modification data, which comprise an indication of the XML node to be modified, as well as the actual content which is to replace the present XML node content, and an expire time, which is stating the time-to-live which is to be applied for the time limited modification of the XML node. The request also comprises information, such as e.g. the relevant XML document version, which enables a particular XML document stored at the Server to be identified.

In a next step 201, it is determined whether there is currently a pending timer for the relevant XML node. If no timer has yet been started for the identified XML node, an associated timer is started on the basis of the received expire time, as indicated with another step 202a. In a further step 203, the present version of the indicated XML node is then stored, for later retrieval, when the timer timeout has expired, and in another step 204, the XML document is updated, by modifying the identified XML node, according to the content of the request.

Although not indicated in the flow chart of FIG. 2, it should be pointed out that at this stage also other Clients may be informed, or notified, of the XML document modification, just as if the modification had been executed according to conventional procedures, e.g. as if a conventional XCAP PUT had been used for carrying the request.

The timer associated with the XML node is then interrogated at the Server as time lapses, as indicated with another step 205, where, in case of no timeout, it is again determined whether a new request for the relevant XML node has arrived, at step 200. One typical reason for repeating the described process by preparing another modification request at the Client and transmitting it to the Server might be for the purpose of prolonging the time-to-live for a modified XML node. In such a case, a request, requesting for the same modification as in a previous request, but possibly with a different expire time, is sent to the Server.

If, while executing step 200, it is found that a new, subsequent request has arrived, and that a timer is pending for the XML node identified in the request, the timer is re-set according to the time-to-live attached to the new request, as indicated with a step 202b.

Upon timer timeout, the XML document is restored, as indicated with a final step 206. XML document restoration is executed by retrieving the stored version of the respective XML node.

At this stage, also other Clients may be informed of the restored XML document, in a conventional manner, e.g. as if the change had been executed, using a conventional XCAP PUT.

In addition to using the suggested method for enabling time limited modifications to be executed in a simplifies manner, it may also be used for the purpose of replacing conventional use of XCAP PUT, including situations when a conventional permanent modification is required. In such a situation, a request according to the modification mechanism described above may be provided to the Server, where the expire time has been set to a very large number, such as e.g. to 1 million years.

Figure 3:
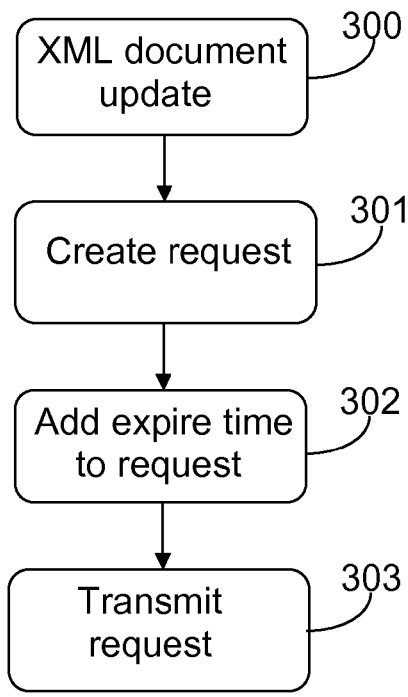
FIG. 3 is a flow chart illustrating a method for preparing a request for a time limited modification at a client and for providing such a request to a server, according to one exemplary embodiment.

As indicated above, a time limited change of an XML node requires some specially adapted method steps to be executed at the Server. FIG. 3 is a flow chart illustrating the corresponding steps to be executed at the Client which is interacting with the Server in order to obtain a time limited modification of an XML node, according to one exemplary embodiment.

In a first step 300 of FIG. 3, a modification of a specific XML node of an XML document is triggered at the Client, typically by a user entering content to be modified via a conventional User Interface (UI), and in a subsequent step 301, a request is created by the Client, where, in addition to conventional data, the request will also comprise an expire time, as indicated with a step 302, and in a final step 303, the request is transmitted to the Server.

Figure 4A:
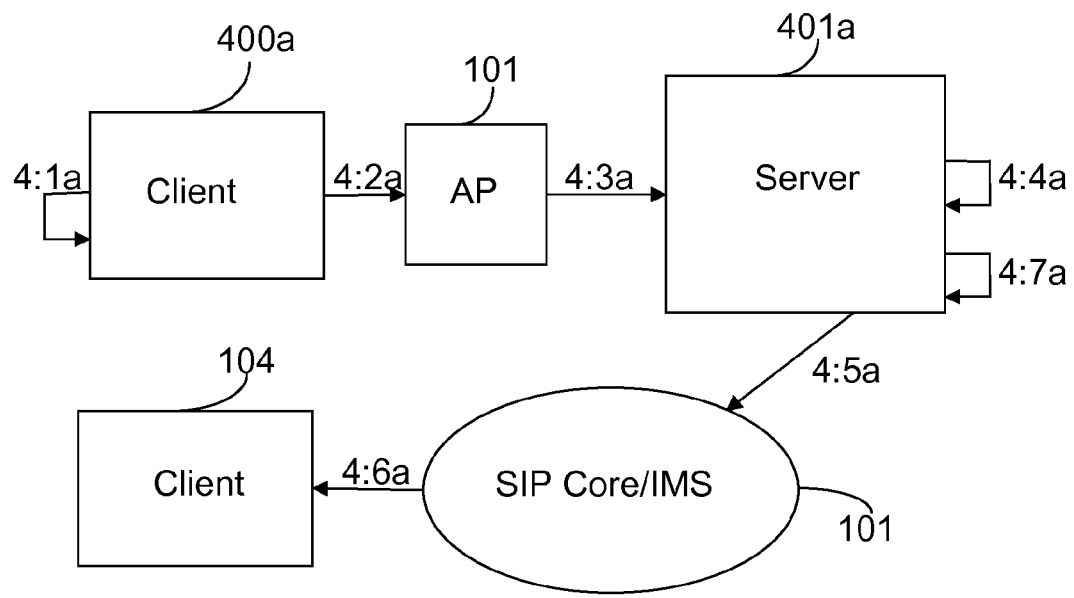
FIG. 4a is a simplified overview illustrating a scenario and procedure for enabling time limited modifications of XML nodes in an server, according to one exemplary embodiment.

The request may be transmitted to the Server using any of a number of different alternative methods. According to one embodiment, where the Client is provided with an XCAP Client function, which may also be referred to as a HTTP Client, but no SIP Client function, a HTTP based method is suggested for transmission of the request. HTTP POST, XCAP Put or XCAP Delete may be used as a carrier for providing a request for a time limited modification of an XML node to a Server. FIG. 4a is a schematic illustration of such a scenario where HTTP POST is used for this purpose.

In a first step 4:1a of FIG. 4a, Client 400a stores a copy of an XML document to be modified and generates a HTTP POST, all according to the method steps described above with reference to FIG. 3. The request comprise modification data, indicating the content to be modified, and time-to-live information, indicating an expire time for the requested modification. The request typically also comprise information about the relevant application usage, the relevant XML document, the document version and/or the relevant operation, which in the present case is the operation "Modify document"

The request is then transmitted to Server 401a in a step 4:2a and a subsequent step 4:3a, and once received by Server 401a, the request is processed, according to the method steps described above with reference to FIG. 2, as indicated with a next step 4:4a. The modification of the executed change may also be notified to other conventional Clients, such as Client

104, or modified Clients (not shown), in accordance with conventional notification procedures, as indicated with steps 4:5a and 4:6a in the figure.

If the time-to-live for the modified XML node is to be prolonged an additional request may be transmitted from Client 400a or another Client which has been adapted accordingly, as long as such a request is received and processed by the Server 401a prior to timeout of a pending timer, associated with the respective XML node.

However, once timeout has been recognized for the timer of the XML node, the respective, modified XML node is restored by retrieving the stored version of the XML node, as indicated with a final step 4:7a. Although not shown in the figure, the latest modification will typically be notified to other conventional Clients 104, and/or modified Clients, according to conventional notification procedures.

According to another alternative embodiment, which may be applied if the Client is provided with a SIP Client function, in addition to an XCAP Client function, a SIP based method may instead be used for a request. SIP Publish may be a suitable carrier for a request, wherein SIP Publish is used for publishing the required information, including an expire time, at the Server, which will use the expire time provided in the SIP Publish to control the life time of the requested modification. The use of SIP Publish as a carrier for a time limited XML node modification request may be achieved e.g. by using the "XCAP-diff event" package, as defined in the IETF draft "An Extensible Markup Language (XML) Configuration Access Protocol (XCAP) Diff event package".draft-ietf-xcapevent-08, Jul. 92009, and by, as a body, sending the same type of patch operation as is today sent in the Notify.

Figure 4B:
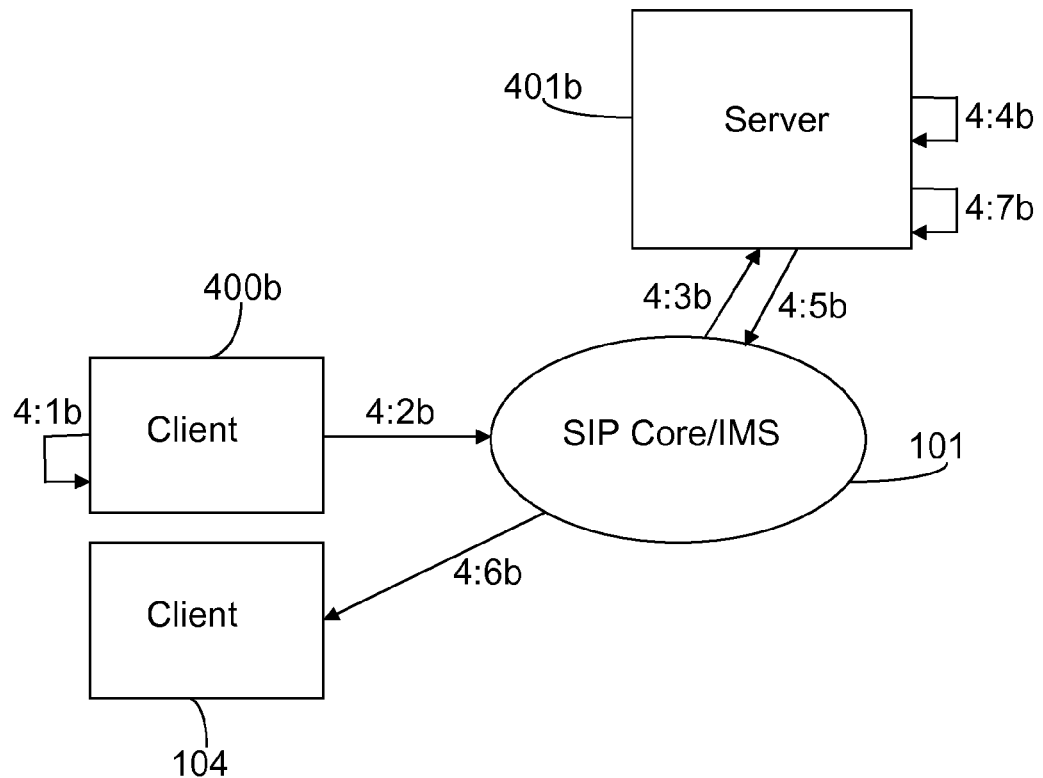
FIG. 4b is a simplified overview illustrating another scenario and procedure for enabling time limited modifications of XML nodes in an server, according to an alternative embodiment.

FIG. 4b is a schematic illustration of another alternative scenario for modifying an XML node of an XML document in a Server, according to the alternative embodiment mentioned above, which rely on the use of a SIP based method, such as e.g. SIP Publish as a carrier for a request. A Client 400b, provided with a SIP Client function, in addition to an XCAP Client function, first stores the XML document to be modified and, uses the SIP Client to initiate a request for a time limited modification, as indicated with a first step 4:1b. Client 400b transmits the request to Server 401b via steps 4:2b and 4:3b, via a SIP Core/IMS 101, or any other suitable network.

The request, which may be carried e.g. in accordance with the XCAP diff format, contains information, indicating the required change, typically in the form of an XML patch, and information about the expire time. The request also comprises information about the relevant version of the XML document, typically in the form of an Etag, Server 401b performs a time limited modification by executing the method steps described above, as illustrated with a step 4:4b. The modification may then be notified to other Clients, such as e.g. conventional Client 104, and/or other modified Clients (not shown), as indicated with steps 4:5b and 4:6b. The notification procedure may be executed e.g. via SIP notify, according to conventional procedures.

The described updating procedure, starting with step 4:1b may be repeated for the same XML node an arbitrary number of times prior to expiry of a pending expire time, e.g. if the expire time for a change is for some reason to be prolonged.

Once a timeout has been recognized for a timer associated with a modified XML node, this node is restored to the content it contained prior to the modification, as indicated with a final step 4:7b. Even though not shown in the figure, other clients may once again be notified of the change, according to conventional procedures, also when applying this embodiment.

Figure 5A:
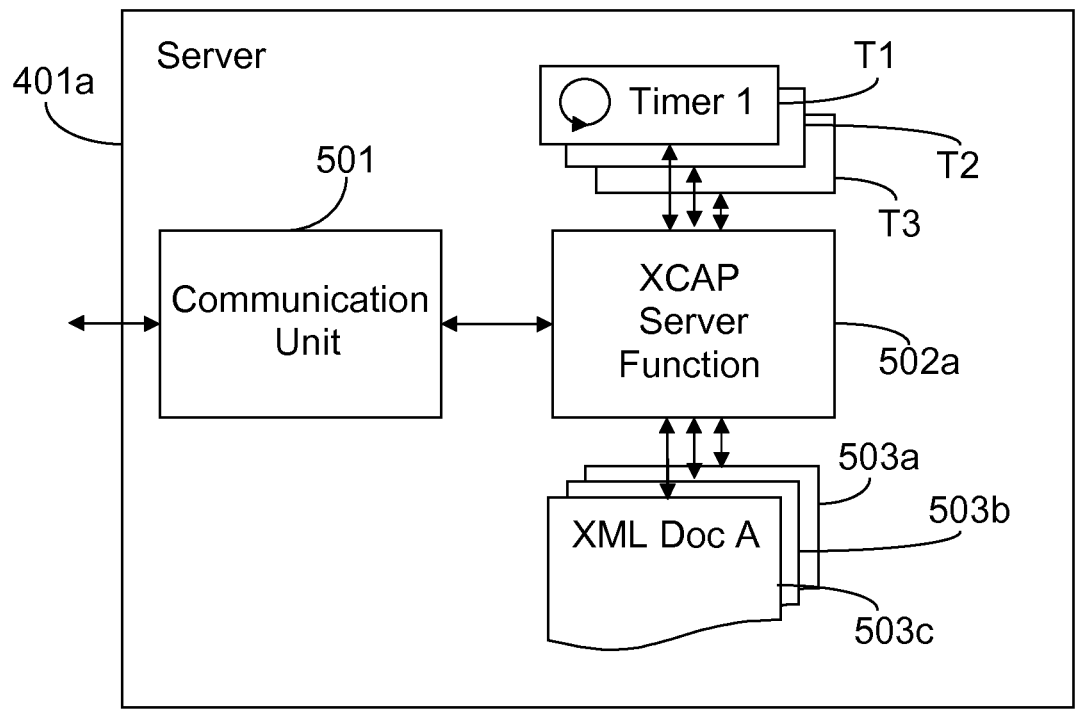
FIG. 5a is a schematic block scheme of a server, according to one exemplary embodiment, which is adapted to execute the procedure of FIG. 3.
Figure 5B:
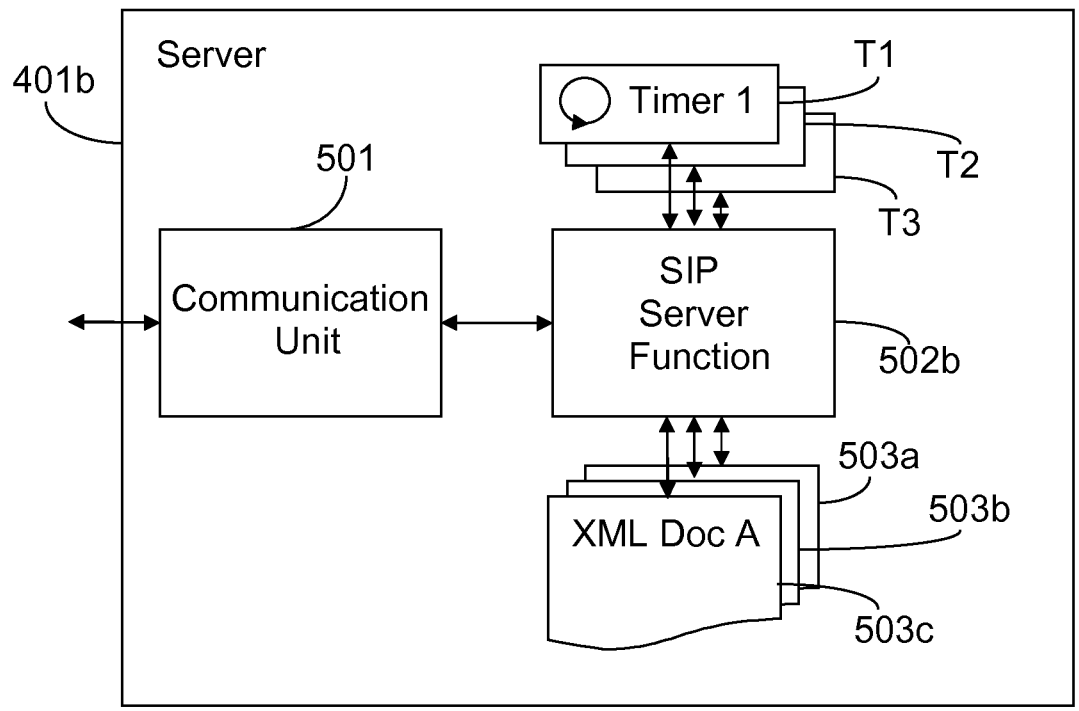
FIG. 5b is another schematic block scheme of a server, according to another exemplary embodiment, which is also adapted to execute the procedure of FIG. 3.

FIGS. 5a and 5b are block diagrams illustrating different simplified exemplary Servers 401a and 401b, arranged to manage time limited modification requests, according to two different embodiments.

Server 401a of FIG. 5a comprises a conventional communication unit 501, which is adapted to receive a time limited modification request and which is connected to an XCAP Server function 502a. The XCAP Server function 502a is adapted to start a timer T1, T2, T3, or to re-set a pending timer T1, T2, T3, according to an expire time provided in a received request, when a new request arrives at the Server 401a, via Communication Unit 501.

The XCAP Server function 502a is also adapted to store the present version of the XML document 503a, 503b, 503c, indicated in the received request, and to modify the XML document, according to content of the request. In addition, the XCAP Server function 502a is adapted to monitor each pending timer and to restore an XML node of a respective XML document 503a, 503b, 503c to a previous version upon recognizing a timer timeout.

FIG. 5b illustrates a Server 401b, according to another, alternative embodiment, which is provided with both an XCAP Server function (not shown), and a SIP Server function 502b. As indicated in FIG. 5b, the Server function 502a of FIG. 5a is replaced by Server function 502b, while the remaining functionality corresponds to the functionality described in the former embodiment.

It is to be understood that in the latter embodiment, the XCAP Server function, which is not shown in FIG. 5b for simplicity reasons, may be a conventional XCAP Server function, or a modified XCAP Server function. In the latter case, server 401b may be provided also with functionality which may operate in accordance with both the arrangement as illustrated in FIG. 5a, and the arrangement as illustrated in FIG. 5a.

Figure 6A:
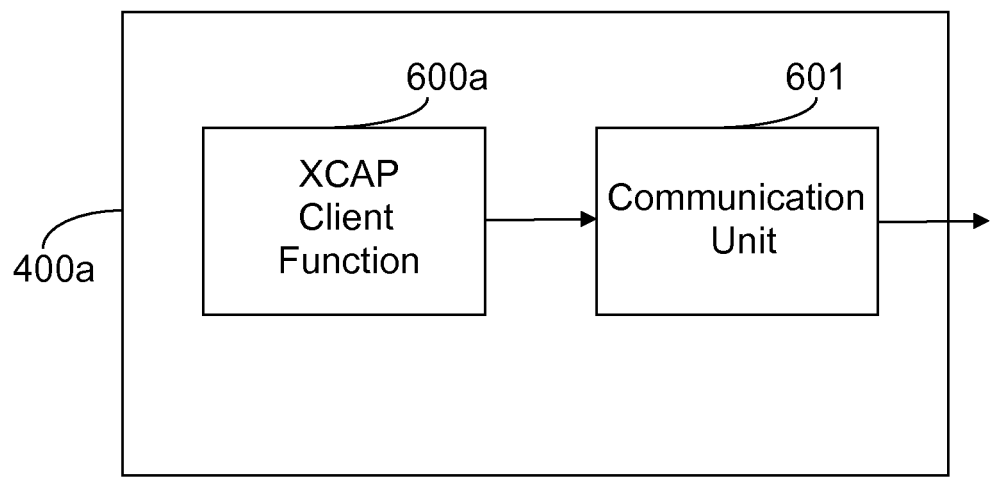
FIG. 6a is a schematic block scheme of a client, according to one exemplary embodiment, which is adapted to execute the procedure of FIG. 4.
Figure 6B:
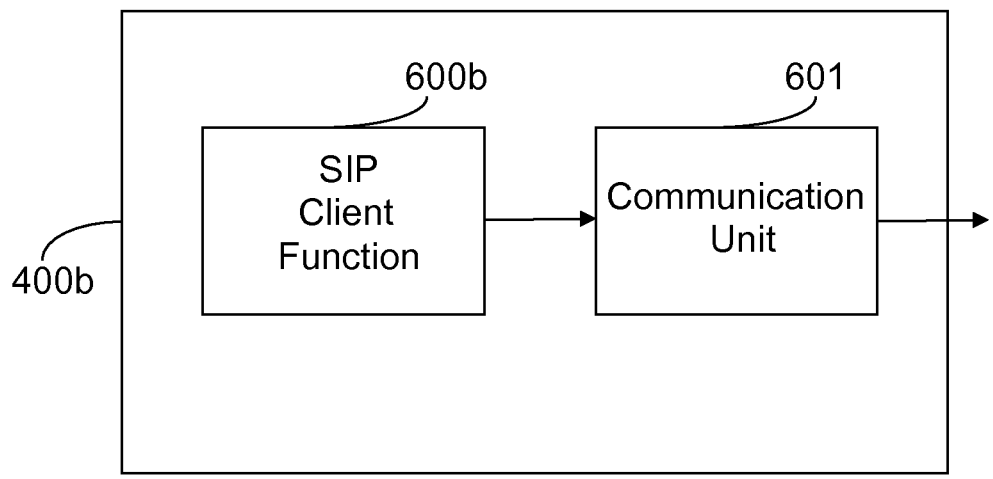
FIG. 6b is another schematic block scheme of a client, according to another exemplary embodiment, which is also adapted to execute the procedure of FIG. 4.

FIGS. 6a and 6b are block diagrams illustrating simplified Clients configurations 600a and 600b, according to two exemplary embodiments, where both Clients are arranged to prepare time limited modification requests and to provide such a request to a Server, such as a corresponding one of the Servers described above, with reference to FIG. 5a or 5b, respectively.

As indicated in FIG. 6a, Client 400a comprises an XCAP Client function 600a, which may be implemented as an embedded Client function on the Client, and which is adapted to recognize a trigger for updating a specific XML node of an XML document on a time limited basis. In response, the XCAP Client function 600a is adapted to create a request by adding XML related data, indicating the XML document, the XML node to be modified, as well as an expire time. XCAP Client function 600a is connected to a conventional Communicating Unit 601, which is adapted to transmit the request to the Server.

FIG. 6b, illustrates how an alternative Client 400b, may instead be provided with a SIP Client function 600b, which has been adapted to provide a time limited modification request to a Server, having a corresponding SIP Server function, such that a time limited modification can be executed at the Server. In resemblance to FIG. 6a, also SIP Client function 600b is connected to a conventional Communication Unit 601. Although, Client 400b normally also comprises an XCAP Client function, which may be configured as a conventional XCAP Client function, or as a modified XCAP Client function, such as Client function 601a, such an additional Client has been omitted in the figure for simplicity reasons.

It is to be understood that the Servers described with reference to FIGS. 5a and 5a, as well as the Clients described with reference to FIGS. 6a and 6b, typically will comprise additional functionality, which may be required for enabling communication and service management. It should also be pointed out that the described Clients typically constitutes a part of a user device, and that such user device typically will comprise conventional functionality, such as e.g. a communication and User Interface functionality. The suggested Clients may be implemented in stationary user devices, such as e.g. a Personal Computer (PC), as well as in mobile user devices, such as e.g. a mobile telephone, a Personal Digital Assistant (PDA) or a Lap Top. However, for simplicity reasons, only functional entities which are of relevant importance for the suggested modification mechanism have been included in the accompanying figures.

The proposed mechanism for applying time limited modifications of an XML document in a Server, provides for a simplified and more reliable modification process, where no need for updating of existing XML schemes with valid time attributes for every single element which has been modified will be required at a Client. This means that the suggested modification functionality may be added on top of any application usage, and applicable for any type of XML document.

Data that is to be modified on a time limited basis will automatically be removed at time out, without requiring any additional activity from the Client from which the modification request was originally launched, and the XML document will contain correctly restored data after the stated time-to-live has expired, even if a Client failure occurs after the Client has sent away a modification request to a Server.

Irrespective of whether a Client is provided with a SIP client or not, it will be able to apply the suggested mechanism, since also a HTTP method is suggested as a possible method for carrying the request.

While the invention has been described with reference to specific exemplary embodiment, the description is generally only intended to illustrate the inventive concept and should not be taken as limiting the scope of the invention. Consequently, the suggested modification mechanism may be applied with other IP applicable protocols than SIP, and in association with services provided from other types of IP based networks than IMS. The invention is defined by the appended claims.

ABBREVIATIONS

HTTP Hypertext Transfer Protocol
IMS IP Multimedia Subsystem
OMA Open Mobile Alliance
SIP Session Initiation Protocol
XCAP XML Configuration Application Protocol
XDMC XDM Client
XDMS XDM Server
XDM XML Document Management
XML Extensible Markup Language

The invention claimed is:

1. A method at a server of a communication network for managing a modification of an XML document, the method comprising the server performing the following:
receiving a request for a time limited modification of a node of an XML document from a client, the request comprising modification data and an expire time, the modification data comprising both an indication of the node of the XML document and actual data to replace present content of the node of the XML document for a limited time, and the expire time indicating a time-to-live for the modification of the node of the XML document;
starting, on the basis of the received expire time, a timer associated with the node of the XML document;
storing, in the server, a copy of the present content of the node of the XML document as a stored version of the node of the XML document;
after storing the copy of the present content of the node of the XML document as a stored version of the node of the XML document, replacing the present content of the node of the XML document with the actual data included in the modification data; and
in response to expiration of the expire time, restoring the node of the XML document to the stored version of the node of the XML document.

2. A method according to claim 1, wherein an updating procedure is performed for the XML node, in case a subsequent request for a time limited modification is received for the XML node prior to timeout of a pending timer, associated with the XML node, the updating procedure comprising the step of:
re-setting the timer, according to the expire time of the subsequent request.

3. A method according to claim 1, wherein the request is transmitted using a HTTP based method.

4. A method according to claim 3, wherein the request is carried in a HTTP Post.

5. A method according to claim 3, wherein the request is carried in an XCAP Put or XCAP Delete.

6. A method according to claim 1, wherein the request is transmitted using a SIP based method.

7. A method according to claim 6, wherein the request is carried in a SIP Publish.

8. A method at a client for enabling a modification of an XML document in a server of a communication network, the method comprising the client performing:
generating a request for a time limited modification of a node of an XML document, the request comprising modification data and an expire time, the modification data comprising both an indication of the node of the XML document and actual data to replace present content of the node of the XML document during the time limited modification, and the expire time indicating a time-to-live for the modification, and
transmitting the request to the server, wherein the request enables the time limited modification of the node of the XML document at the server, the modification being valid for the duration of the expire time and restorable to the previous version of the node of the XML document in response to expiration of the expire time.

9. A method for prolonging the time-to-live by repeating the steps according to claim 8, wherein a new request, is provided with the same modification data and the same or a different expire time.

10. A method according to claim 9, wherein the request is transmitted using a HTTP based method.

11. A method according to claim 10, wherein the request is carried in a HTTP Post.

12. A method according to claim 10, wherein the request is carried in an XCAP Put or XCAP Delete.

13. A method according to claim 9, wherein the request is transmitted using a SIP based method.

14. A method according to claim 13, wherein the request is carried in a SIP Publish.

15. A server of a communication network for managing modifications of an XML document, wherein the server comprises:
    a processor adapted to receive a request for a time limited modification of a node of an XML document from a client, the request comprising modification data and an expire time, the modification data comprising both an indication of the node of the XML document and actual data to replace present content of the node of the XML document for a limited time, and the expire time indicating a time-to-live for the modification, the processor further adapted to control an updating procedure in response to receiving a request for a time limited modification, by initiating:
    starting, on the basis of the expire time, a timer, associated with the node of the XML document;
    storing, in the server, a copy of the present content of the node of the XML document, and
    after storing the copy of the present content of the node of the XML document as a stored version of the node of the XML document replacing the present content of the node of the XML document with the actual data included in the modification data,
    the processor being further adapted to restore the node of the XML document to the stored version of the node of the XML document in response to expiration of the expire time.

16. A server according to claim 15, wherein the processor is further adapted to re-set the pending timer, on the basis of an expire time of a subsequent request, in response to receiving a subsequent request for a time limited modification of the XML node, prior to recognizing timeout of the pending timer.

17. A server according to claim 15, wherein the processor controls the updating procedure using an XCAP server function.

18. A server according to claim 17, wherein the processor controls the updating procedure using a SIP server function.

19. A server according to claim 15, wherein the server is an XDM Server.

20. A client for enabling a modification of an XML document in a server of a communication network, wherein the client comprises:
    a processor adapted to:
    generate a request for a time limited modification of a node of an XML document, the request comprising modification data and an expire time, the modification data comprising both an indication of the node of the XML document and actual data to replace present content of the node of the XML document during the time limited modification, and the expire time indicating a time-to-live for the modification, and
    control transmission of the request to the server, wherein the request enables the requested modification of the node of the XML document to be performed at the server, the modification being valid for the duration of the expire time and restorable to the previous version of the node of the XML document in response to expiration of the expire time.

21. A client according to claim 20, wherein the processor executes an XCAP client function, which is adapted to generate the request using a HTTP method.

22. A client according to claim 21, wherein the processor is adapted to use a HTTP Post as carrier for the request.

23. A client according to claim 21, wherein the processor is adapted to use an XCAP Put or an XCAP Delete as carrier for the request.

24. A client according to claim 21, wherein the processor executes a SIP client function, which is adapted to generate the request using a SIP method.

25. A client according to claim 24, wherein the processor is adapted to use a SIP Publish as carrier for the request.

26. A client according to claim 20, wherein the client is an XDM client.

27. A client according to claim 20, wherein the client is implemented on any of a mobile telephone, a PDA, a laptop or a PC.

* * * * *